Patented Nov. 11, 1930

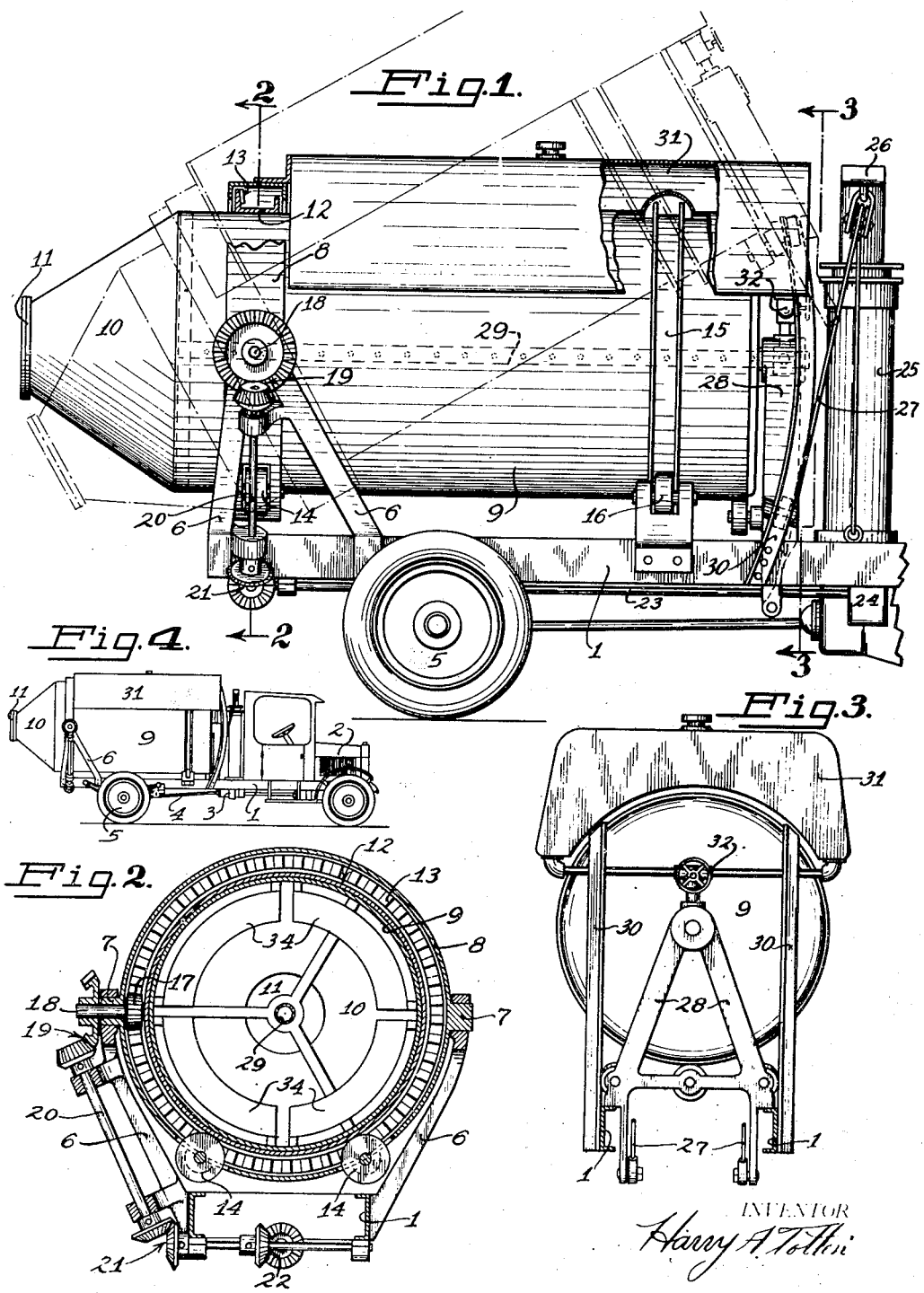

1,780,956

UNITED STATES PATENT OFFICE

HARRY A. TOTTEN, OF BURLINGAME, CALIFORNIA, ASSIGNOR TO TRANSIT MIXERS, INC., OF SAN FRANCISCO, CALIFORNIA, A CORPORATION OF NEVADA

CONCRETE-MIXING APPARATUS

Application filed March 25, 1929. Serial No. 349,553.

My invention relates to concrete or mortar mixers of the type mounted on an automobile truck or chassis, and the principal object of the invention is to dispense with the usual subframe associated with the mixer element. Also to provide a drive of a novel type whereby the mixer element is adapted for revolving when either in normal or tilted position. A further object is to provide a novel form of cradle for revolubly mounting the mixer element and to fulcrum the same in a novel manner at a point above the lower periphery of the mixer element. Other objects will appear as the description progresses; however, it is to be understood that various changes in the form, proportion, size and minor details of construction within the scope of the claims may be resorted to without departing from the spirit or sacrificing any of the advantages of the invention.

In the drawings disclosing the preferred embodiment of my invention:—

Fig. 1 is a view in enlarged detail of the rear portion of the chassis of an automobile truck illustrating the mixer element in normal position in full lines and in tilted position in dotted lines.

Fig. 2 is a vertical transverse section on line 2—2 of Fig. 1.

Fig. 3 is a vertical transverse section on line 3—3 of Fig. 1.

Fig. 4 is a view in reduced side elevation disclosing the invention mounted on an automobile truck.

In the drawings, wherein like characters of reference designate corresponding parts, 1 indicates an automobile truck chassis having a power plant 2, gear box 3, a drive 4 to the rear supporting wheels 5.

Extending upwardly from the sides of the chassis 1 at its rear end are frame members or arms 6 in the upper ends of which are journalled trunnions 7 of a supporting ring 8, the trunnions being disposed transversely of the chassis 1 at a point above its rear end. Revolubly mounted within the ring 8 is a mixer element 9 in the form of a cylinder disposed longitudinally of the rear end of the chassis 1 and its rear end illustrated as projecting over or overhanging the rear of the chassis 1 is of conical formation 10, and is provided with an opening which may be closed by a door 11. The mixer element at a point within the ring 8 mounts a circumferential channel member 12, one flange of which is toothed on its inner face at 13, and between the opposite channels extend the supporting idlers 14 carried by the ring near its bottom. Near its forward end the mixer element 9 carries a second annular channel 15 affording a trackway for the supporting idler 16 carried by opposite sides of the chassis 1, as illustrated in Fig. 1. To rotate the mixer element, a pinion 17 engages the toothed ring 13 and said pinion is revolubly mounted on a shaft 18 within one of the trunnions 7 rotatable coaxially within the trunnion and adapted to rotate independently of any movement thereof. On its outer end, the pinion has geared connection 19 with a shaft 20 journalled in one of the arms 6, and said shaft is in turn connected through gearing 21 and 22 with the power take-off shaft 23 extending from a power take-off 24 associated with the gear box 3. This power take-off is of the usual type and is adapted to deliver power to the shaft 3 at the will of the operator at any time when the vehicle power plant is operating regardless of whether the vehicle is moving or not. It will thus be apparent that the mixer element 9 may be revolved at the will of the operator and regardless of its position relative to the chassis or whether the vehicle is or is not in motion.

Any suitable form of elevating or tipping means may be provided for raising the forward end of the mixer element 9, that shown consisting of a hydraulic cylinder 25, the plunger 26 of which is connected by cables 27 with the arms of frame 28, the latter affording a journal for a tubular pipe 29 extending axially into the mixer element 9 from its forward end. Guide rails 30 extending upwardly from the sides of the chassis 1 prevent the rotation of the frame 28 should one of the cables 27 become broken or fouled.

Under certain conditions, it is desirable to admit water or a mixing fluid to the contents of the mixer element 9, and this fluid is illustrated as being contained in a tank 31 astride of the upper surface of the element 9. The tank is connected through a valve controlled pipe 32 with the interior of the pipe 29, this being clearly illustrated in Fig. 1, and the water entering the pipe 29 discharges therefrom through perforations illustrated in Fig. 2.

It will be apparent that in this embodiment the supplementary frame is dispensed with, and that the fulcrum point for tilting the mixer element is located above the lower peripheral edge thereof, and in this embodiment on a line parallel with the longitudinal centering of the mixer element. This construction enables the discharge end of the mixer element to swing inwardly when the forward end of the mixer element is raised, whereas in structures wherein the subframe is employed, the discharge end of the mixer element moves outwardly when its forward end is raised. The present structure enables a greater angle to be obtained with a lesser pivotal movement. Idlers 14 and 16 cooperating with their respective channels 12 and 15, afford thrust bearings for the mixer element when the latter is in its normal position. Channel 15 disconnects from idlers 16 when the mixer element tilts placing the thrust on the idlers 14. On its interior the mixer element may mount any approved type of aggregate agitating means such as the spirally disposed blades 34.

By referring to the position of the mixer element in its normal and tilted or dumping position, it will be observed that, when it is tilted to dumping position, the load is shifted inwardly toward a point beneath the fulcrum point thus relieving the chassis of that strain which is present when the supplemental frame is employed and fulcrums at the rear of the chassis.

I claim:—

1. The combination with the main frame of a road vehicle, a mixer element disposed longitudinally of said vehicle frame, a cradle for revolubly supporting the mixer near the rear end of said frame, means for fulcruming said cradle on a horizontal axis at a point above the lower periphery of the mixer element, means for supporting the forward end of said mixer element when in normal positions, means independent of said last mentioned means for supporting the forward end of the mixer element in tilted positions, means for rotating the mixer element, and means for tilting the mixer element.

2. The combination with the main frame of a road vehicle, a mixer element disposed longitudinally of said vehicle frame, a cradle for revolubly supporting the mixer near the rear end of said frame, means for fulcruming said cradle on a horizontal axis at a point above the lower periphery of the mixer element, means for revolubly supporting the forward end of said mixer element when in normal positions, means independent of said last mentioned means for revolubly supporting the forward end of the mixer element in tilted positions, means for revolving the mixer element when in normal or tilted positions, and means for tilting the mixer element.

3. The combination with the main frame of a road vehicle, a mixer element disposed longitudinally of said vehicle frame, a cradle for revolubly supporting the mixer near the rear end of said frame, means for fulcruming said cradle on a horizontal axis at a point above the lower periphery of the mixer element, means for supporting the forward end of said mixer element when in normal positions, means independent of said last mentioned means for supporting the forward end of the mixer element in tilted positions, means for revolving the mixer element axially through the cradle fulcrum means, and means for tilting the mixer element.

4. The combination with an automobile truck chassis, a revoluble mixer element mounted longitudinally upon said truck chassis, a cradle supporting said mixer element and pivotally connected to said chassis at a point above the lower periphery of the mixer element whereby the mixer fulcrums on a horizontal axis disposed transversely thereof, means for supporting the forward end of said mixer element when in normal positions, means independent of said last mentioned means for supporting the forward end of said mixer element when in tilted positions, and drive means connecting the truck's power plant with the mixer element.

5. The combination with an automobile truck chassis, a revoluble mixer element mounted longitudinally upon said truck chassis, a cradle supporting said mixer element and pivotally connected to said chassis at a point above the lower periphery of the mixer element whereby the mixer fulcrums on a horizontal axis disposed transversely thereof, means for supporting the forward end of said mixer element when in normal positions, means independent of said last mentioned means for supporting the forward end of said mixer element when in tilted positions, and drive means connecting the truck's power plant with the mixer element, and including an element extended axially through one of the cradle pivots and having driving connection with the mixer element.

6. The combination with an automobile truck chassis, a revoluble mixer element mounted longitudinally upon said truck chassis, arms extending upwardly from the chassis, a cradle fulcrumed between said arms to swing on a horizontal axis transversely of the chassis and pivotally supporting said mixer element near the rear of said chassis, means for revolubly supporting the forward end of said mixer element when in normal positions, means independent of said last mentioned means for revolubly supporting the forward end of the mixer element in tilted positions, means for tilting the mixer element, and means for revolving said mixer element when in either normal or tilted position.

7. The combination with an automobile truck chassis, a revoluble mixer element mounted longitudinally upon said truck chassis, arms extending upwardly from the chassis, a cradle fulcrumed between said arms to swing on a horizontal axis transversely of the chassis and pivotally supporting said mixer element near the rear of said chassis, means for revolubly supporting the forward end of said mixer element when in normal positions, means independent of said last mentioned means for revolubly supporting the forward end of the mixer element in tilted positions, means for tilting the mixer element, and means for revolving said mixer element when in either normal or tilted position, including an element journalled co-axially within the cradle fulcrum, said element having driving connection with the mixer element and with the automobile power plant.

8. The combination with an automobile truck chassis, a revoluble mixer element mounted longitudinally upon said truck chassis, arms extending upwardly from the chassis, a cradle fulcrumed between said arms to swing on a horizontal axis transversely of the chassis pivotally supporting and at least partly embracing said mixer element near the rear of said chassis, means for revolubly supporting the forward end of said mixer element when in normal positions, means independent of said last mentioned means for revolubly supporting the forward end of the mixer element in tilted positions, means for tilting the mixer element, and means for revolving said mixer element when in either normal or tilted position.

9. The combination with an automobile truck chassis, a revoluble mixer element mounted longitudinally upon said truck chassis, arms extended upwardly from opposite sides of the chassis near its rear end, a cradle between said arms fulcrumed at its opposite ends thereto on a horizontal axis transversely of the chassis, said cradle affording a means within which said mixer element is received with the cradle at least partly embracing the same and fulcruming as a unit with the mixer element, means for supporting the forward end of said mixer element when in normal positions, guided means independent of said last mentioned means for supporting the forward end of the mixer element in tilted positions, means for tilting the mixer element, and means for revolving the mixer element.

In testimony whereof I have signed my name to this specification.

HARRY A. TOTTEN.